(12) United States Patent
Saha et al.

(10) Patent No.: US 11,591,914 B2
(45) Date of Patent: Feb. 28, 2023

(54) CUPPED CONTOUR FOR GAS TURBINE ENGINE BLADE ASSEMBLY

(71) Applicant: United Technologies Corporation, Farmington, CT (US)

(72) Inventors: Dipanjan Saha, New Milford, CT (US); Brooks E. Snyder, Glastonbury, CT (US); Thomas N. Slavens, Moodus, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 896 days.

(21) Appl. No.: 16/426,036

(22) Filed: May 30, 2019

(65) Prior Publication Data

US 2019/0316474 A1    Oct. 17, 2019

Related U.S. Application Data

(62) Division of application No. 14/828,063, filed on Aug. 17, 2015, now Pat. No. 10,344,597.

(51) Int. Cl.
*F01D 5/18* (2006.01)
*B23K 26/34* (2014.01)
(Continued)

(52) U.S. Cl.
CPC ............... *F01D 5/187* (2013.01); *B23K 26/34* (2013.01); *B33Y 10/00* (2014.12); *B33Y 80/00* (2014.12);
(Continued)

(58) Field of Classification Search
CPC .......... F01D 5/188; F01D 5/143; F01D 5/085; F01D 5/088; F01D 5/08; F01D 5/187; F01D 25/12; F01D 9/041; F05D 2240/81; F05D 2260/204; F05D 2220/32; F05D 2230/21; F05D 2230/30; B23K 26/34;
(Continued)

(56) References Cited

U.S. PATENT DOCUMENTS

| 6,644,920 B2* | 11/2003 | Beeck | F01D 5/186 416/193 A |
| 6,969,232 B2* | 11/2005 | Zess | F04D 29/681 416/193 A |

(Continued)

FOREIGN PATENT DOCUMENTS

EP    2666965    11/2013

OTHER PUBLICATIONS

European Search Report for European Patent Application No. 16184377.6 completed Dec. 16, 2016.

*Primary Examiner* — Kenneth Bomberg
*Assistant Examiner* — Adam W Brown
(74) *Attorney, Agent, or Firm* — Carlson, Gaskey & Olds, P.C.

(57) ABSTRACT

A gas turbine engine assembly according to an example of the present disclosure includes, among other things, an endwall having a first material composition, an airfoil extending in a radial direction from the endwall, and a cupped contour of a second material composition that is formed on the endwall to define a cooling chamber, the first material composition different than the second material composition. A method of forming an endwall is also disclosed.

16 Claims, 4 Drawing Sheets

(51) Int. Cl.
  *B33Y 80/00* (2015.01)
  *B33Y 10/00* (2015.01)
  *F01D 9/04* (2006.01)
  *F01D 25/12* (2006.01)
  *B22F 5/04* (2006.01)
  *B22F 7/08* (2006.01)
  *B23K 101/00* (2006.01)
  *B22F 10/20* (2021.01)

(52) U.S. Cl.
  CPC ............ *F01D 9/041* (2013.01); *F01D 25/12* (2013.01); *B22F 5/04* (2013.01); *B22F 7/08* (2013.01); *B22F 10/20* (2021.01); *B23K 2101/001* (2018.08); *F05D 2220/32* (2013.01); *F05D 2230/21* (2013.01); *F05D 2230/30* (2013.01); *F05D 2240/81* (2013.01); *F05D 2260/204* (2013.01); *Y02P 10/25* (2015.11); *Y02T 50/60* (2013.01)

(58) Field of Classification Search
  CPC ... B23K 2101/001; Y02P 10/25; B33Y 10/00; B33Y 80/00; B22F 5/04; B22F 7/08; B22F 10/20; Y02T 50/60
  See application file for complete search history.

(56) References Cited

U.S. PATENT DOCUMENTS

| | | | |
|---|---|---|---|
| 7,621,718 B1* | 11/2009 | Liang | F01D 25/12 |
| | | | 415/115 |
| 7,766,618 B1 | 8/2010 | Liang | |
| 8,251,665 B2* | 8/2012 | Baldauf | F01D 9/065 |
| | | | 416/193 A |
| 8,668,454 B2* | 3/2014 | Wiebe | F01D 5/18 |
| | | | 416/97 R |
| 8,884,182 B2 | 11/2014 | Lee et al. | |
| 8,961,134 B2* | 2/2015 | Beeck | F01D 5/147 |
| | | | 416/193 A |
| 2005/0058545 A1* | 3/2005 | Cardenas | F01D 5/081 |
| | | | 416/97 R |
| 2010/0173172 A1 | 7/2010 | Killian et al. | |
| 2011/0264413 A1 | 8/2011 | Stankowski et al. | |
| 2011/0223005 A1* | 9/2011 | Lee | B23P 6/007 |
| | | | 29/889.1 |
| 2012/0230838 A1 | 9/2012 | Hada | |
| 2013/0004331 A1* | 1/2013 | Beeck | F01D 5/143 |
| | | | 416/193 A |
| 2013/0280093 A1 | 10/2013 | Zelesky et al. | |
| 2014/0079540 A1 | 3/2014 | Morris et al. | |
| 2014/0099476 A1 | 4/2014 | Subramanian et al. | |
| 2014/0130354 A1 | 5/2014 | Pal et al. | |

* cited by examiner

CUPPED CONTOUR FOR GAS TURBINE ENGINE BLADE ASSEMBLY

CROSS-REFERENCE TO RELATED APPLICATION

This application is a divisional of U.S. patent application Ser. No. 14/828,063 filed Aug. 17, 2015.

BACKGROUND

This disclosure relates to a contoured endwall of a gas turbine engine blade assembly.

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

The compressor and turbine sections of a gas turbine engine typically include alternating rows of rotating blades and stationary vanes. The turbine blades rotate and extract energy from the hot combustion gases that are communicated through the gas turbine engine. The turbine vanes prepare the airflow for the next set of blades.

The vanes and blades extend from endwalls that may be contoured to manipulate flow. The outer casing of an engine static structure may include one or more blade outer air seals (BOAS) providing endwalls that are be contoured to manipulate flow by reducing secondary flow losses and flow migration.

SUMMARY

A method of forming an endwall with a contour according to an exemplary aspect of the present disclosure includes, among other things, casting an endwall with at least one cooling channel having an opening from the endwall, and covering the opening with a cupped contour that is formed on the endwall to provide a portion of a gas path surface.

In a further non-limiting embodiment of the foregoing method, the method includes forming the cupped contour on the endwall using additive manufacturing.

In a further non-limiting embodiment of any of the foregoing methods, the endwall has a first material composition, and the cupped contour has a second material composition different than the first material composition.

In a further non-limiting embodiment of any of the foregoing methods, the method includes forming the cupped contour on a radially facing surface of the endwall.

In a further non-limiting embodiment of any of the foregoing methods, the method includes covering an inlet to at least one cooling channel of the endwall with the cupped contour.

In a further non-limiting embodiment of any of the foregoing methods, an outlet and the inlet open to a cooling chamber provided by the cupped contour.

In a further non-limiting embodiment of any of the foregoing methods, the endwall is an endwall of a blade.

In a further non-limiting embodiment of any of the foregoing methods, the method includes providing at least one cooling channel in the endwall using a core held within a mold during the casting.

In a further non-limiting embodiment of any of the foregoing methods, a portion of the core providing the opening of the cooling channel provides an attachment point that secures the core within the mold.

In a further non-limiting embodiment of any of the foregoing methods, the endwall is an endwall of a blade assembly and the attachment point is a first attachment point, a second attachment point that secures the core within the mold is adjacent a blade tip of the blade assembly, and a third attachment point that secures the core within the mold is adjacent a root of the blade assembly.

A gas turbine engine assembly according to another exemplary aspect of the present disclosure includes, among other things, an endwall having a first material composition, and a cupped contour of a second material composition that is formed on the endwall. The first material composition is different than the second material composition.

In a further non-limiting embodiment of the foregoing assembly, at least one cooling channel of the endwall opens to a cooling chamber provided by the cupped contour.

In a further non-limiting embodiment of any of the foregoing assemblies, the endwall is entirely radially misaligned from the cooling chamber.

In a further non-limiting embodiment of any of the foregoing assemblies, the cupped contour covers one or more cooling channel openings.

In a further non-limiting embodiment of any of the foregoing assemblies, the cupped contour covers one or more cooling channel inlets.

In a further non-limiting embodiment of any of the foregoing assemblies, the endwall is an endwall of a blade.

In a further non-limiting embodiment of any of the foregoing assemblies, the endwall is a cast endwall, and the cupped contour is an additively manufactured cupped contour.

A gas turbine engine blade assembly according to an exemplary aspect of the present disclosure includes, among other things, an endwall with a plurality of cooling channels, an airfoil extending radially from the endwall to a tip, and a cupped contour formed on the endwall to provide a cooling chamber between the cupped contour and a radially facing surface of the endwall.

In a further non-limiting embodiment of the foregoing assembly, at least one opening of the plurality of cooling channels opens to the cooling chamber, and at least one inlet of the plurality of cooling channels opens to the cooling chamber. The cupped contour covers the at least one opening and the at least one inlet.

In a further non-limiting embodiment of any of the foregoing assemblies, the endwall is a cast endwall, and the cupped contour is and additively manufactured cupped contour.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to a contoured endwall of an assembly of a gas turbine engine assembly. More particularly, this disclosure relates to a cupped contour that provides a cooling chamber. A cooling channel formed within an endwall of a gas turbine engine assembly opens to the cooling chamber within the cupped contour.

Figure 1:
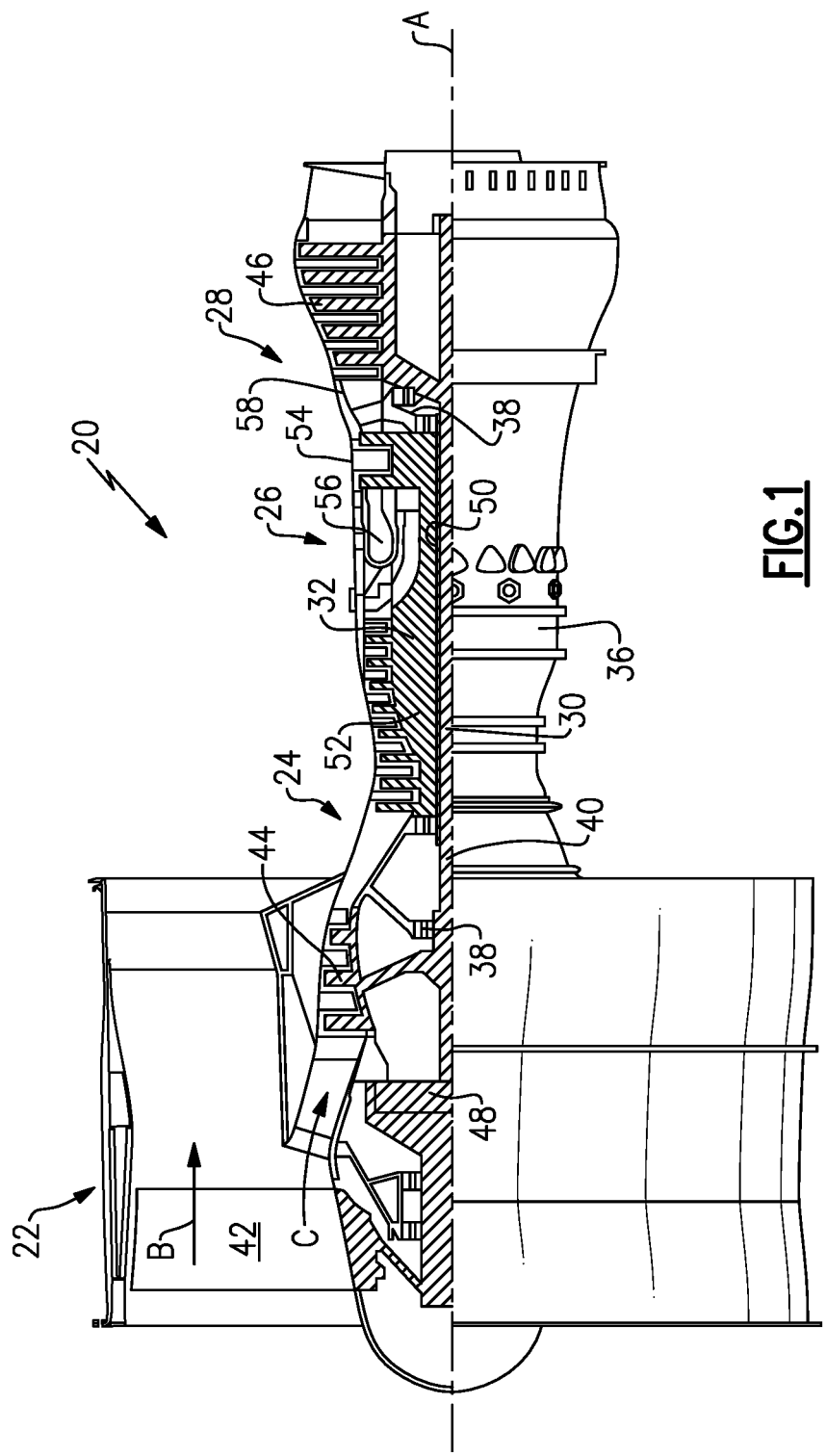
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28.

The fan section 22 drives air along a bypass flow path B in a bypass duct defined within a nacelle, while the compressor section 24 drives air along a core flow path C for compression and communication into the combustor section 26, and then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils, which are in the core airflow path C.

The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
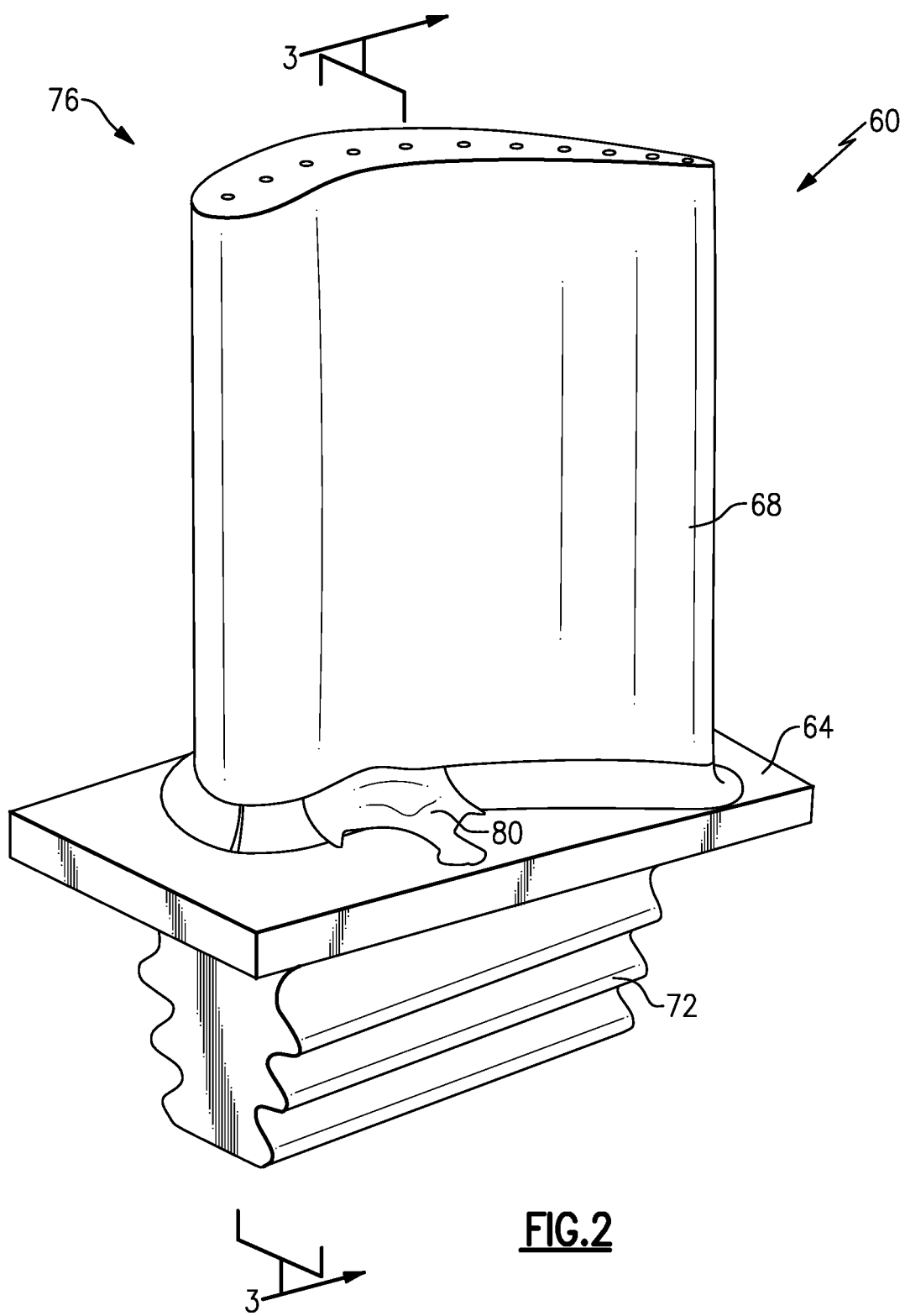
FIG. 2 illustrates a gas turbine engine blade assembly from a turbine section of the gas turbine engine of FIG. 1 having a cupped contour formed on an endwall.

Referring now to FIG. 2 with continuing reference to FIG. 1, an example gas turbine engine blade assembly 60 from the turbine section 28 of the gas turbine engine of FIG. 1 includes an endwall 64, an airfoil 68, and a root 72 or base. The airfoil 68 extends radially in a first direction from the endwall 64 to a tip region 76. The root 72 extends radially in an opposite, second direction from the endwall 64.

The blade assembly 60 includes a cupped contour 80 formed on the endwall 64. The cupped contour 80 helps manipulate and direct flow over and near the endwall 64 when the gas turbine engine blade assembly 60 is used in the gas turbine engine 20. In another example, an endwall of a vane includes the cupped contour.

Figure 3:
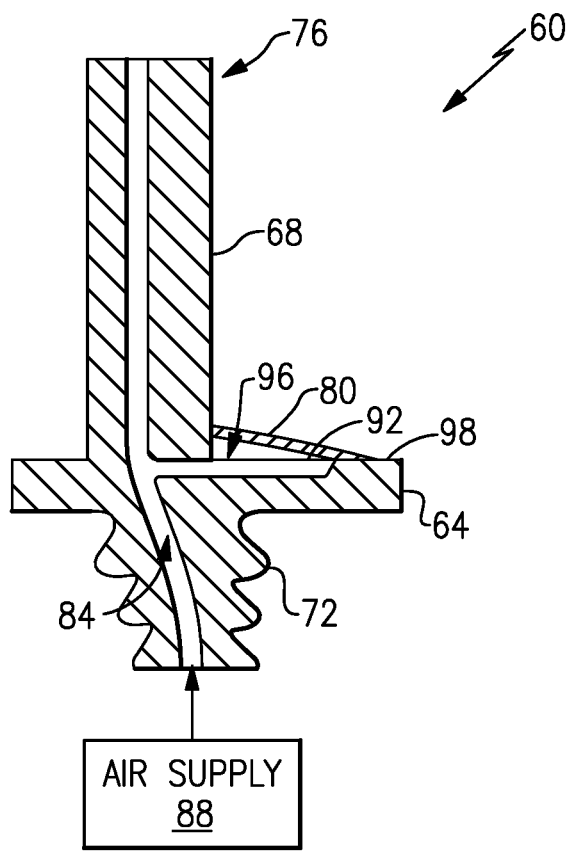
FIG. 3 illustrates a section view of the gas turbine engine blade assembly at the Line 3-3 in FIG. 2.
Figure 4:
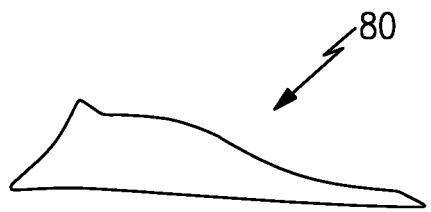
FIG. 4 illustrates a close-up side view of the cupped contour from the gas turbine engine blade assembly of FIG. 2.
Figure 5:
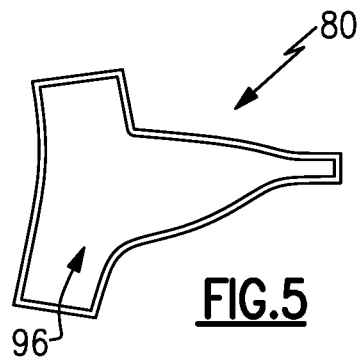
FIG. 5 illustrates a bottom view of the cupped contour of FIG. 3 showing a cooling chamber of the cupped contour.

Referring now to FIGS. 3-5 with continuing reference to FIG. 2, the blade assembly 60 includes at least one cooling channel 84. During operation, fluid, such as air from an air supply 88, communicates through the cooling channel 84 to cool the gas turbine engine blade assembly 60. The compressor section 24 of the gas turbine engine 20 (FIG. 1) provides the air supply 88 in some examples.

In this example, air enters the at least one cooling channel 84 near the root 72. The air communicates through the cooling channel 84 and exits at an outlet near the tip region 76 of the airfoil 68. The air communicates thermal energy from the blade assembly 60.

For simplicity, a single cooling channel 84 is shown in FIG. 3. The blade assembly 60 could include, however, a network of several cooling channels 84 that are each separate and distinct from one another. The cooling channels 84 could have a serpentine configuration. The cooling channels 84 could have an outlet in a leading edge of the airfoil 68, the trailing edge of the airfoil 68, or some other area of the blade assembly 60.

The example cooling channel 84 extends through a portion of the endwall 64, such that the endwall 64 provides a portion of the at least one cooling channel 84. The endwall 64 provides an opening 92 from the portion of the cooling channel 84 within the endwall 64. Air communicates from the cooling channel 84 of the endwall 64 through the opening 92 into a cooling chamber 96 provided by the cupped contour 80. Moving air into the cooling chamber 96 cools the cupped contour 80, the endwall 64, or both. The cooling chamber 96 is part of the cooling channel 84 in this example.

Notably, in this example, the cupped contour 80 covers the opening 92 so that air does not exit directly from the cooling chamber 96. Moving air through the cooling chamber 96 of the cooling channel 84 cools the cupped contour 80. Prior art contours have lacked cooling chambers, and thus were prone to experience undesirable temperature extremes.

The endwall 64 is, in this example, a cast metallic component. The endwall 64 is cast together with the airfoil 68 and the root 72. The cupped contour 80 is then applied to the endwall 64 via an additive manufacturing process.

Figure 6:
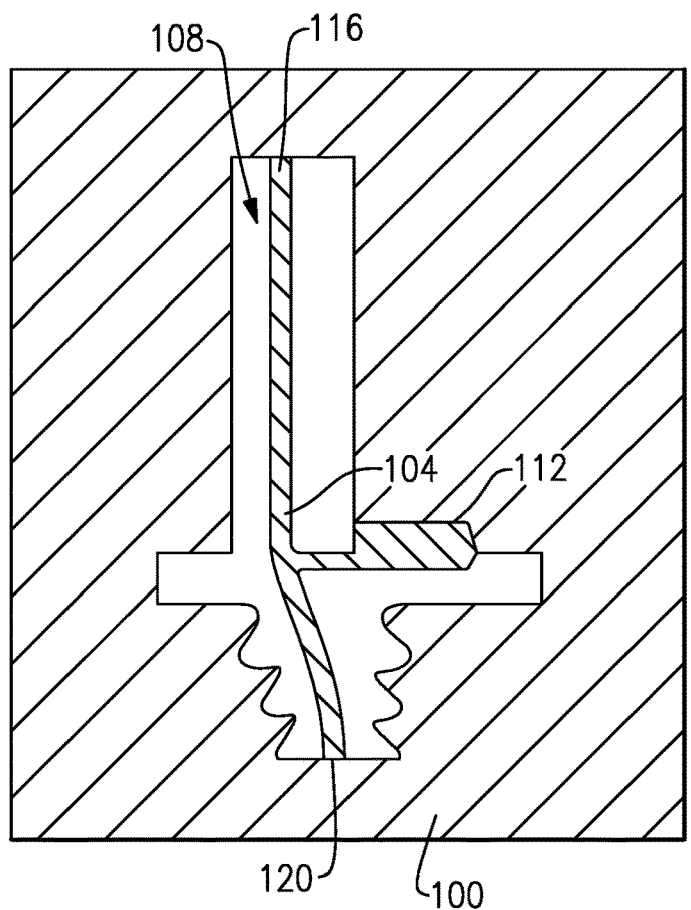
FIG. 6 illustrates a section view at a position of Line 3-3 of a mold and a core used to cast the gas turbine engine blade assembly of FIG. 2.

Referring now to FIG. 6, with continuing reference to FIG. 3, a mold 100 and a core 104 provide an open area 108 that receives molten material when casting the endwall 64, the airfoil 68, and the root 72. The open area 108 is filled with a wax that melts when molten material is introduced into the open area 108.

The core 104 is a silica-based ceramic core in this example, but other materials such as alumina based ceramics or refractory metals are possible. The core 104 blocks the molten material from entering areas that will form the cooling chamber 84 within the endwall 64, the airfoil 68, and the root 72.

The core 104 includes a first attachment point 112, a second attachment point 116, and a third attachment point 120. The attachment points 112, 116, and 120 provide an at least 3-point physical datum nest on the core 104 surface retaining the core 104 to design intent relative to the mold 100 when casting the endwall 64, the airfoil 68, and the root 72.

The first attachment point 112 extends through an area that will provide the opening 92 to the cooling chamber 96. The second attachment point 116 is adjacent an area that will form the tip region 76. The third attachment point 120 is adjacent an area that will provide the root 72.

Prior art cores used to create cooling channels within gas turbine engine blades have lacked at least an attachment point near the endwall, which can complicate the casting process as the core was more difficult to stabilize within a mold. With a lack of a third contact retention feature, outside of attachment points 116 and 120, the core exhibits a rotational degree of freedom revolving around an axis created by the centroid points of 116 and 120. This rotation, during casting, allows the core 104 to misalign and can negatively impact the desire casting wall thickness distribution.

Figure 7:
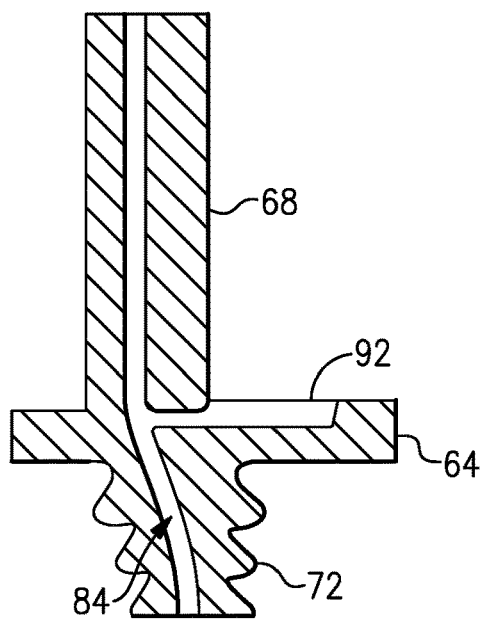
FIG. 7 illustrates a section view of the gas turbine engine blade assembly of FIG. 2 at Line 3-3 prior to forming a cupped contour formed on the endwall.

Referring now to FIG. 7, when the molten material has hardened within the open area 108, the endwall 64, the airfoil 68, and the root 72 are removed from the mold 100. The cooling chamber 84 extends through these portions of the gas turbine engine blade assembly 60.

The opening 92 within the endwall 64 extends through a surface 98 of the endwall 64 that will face radially outward when positioned within the gas turbine engine 20 of FIG. 1. The cupped contour 80 is radially outside the surface of the endwall 64 such that the endwall 64 is radially misaligned from the cooling chamber 96.

Figure 8:
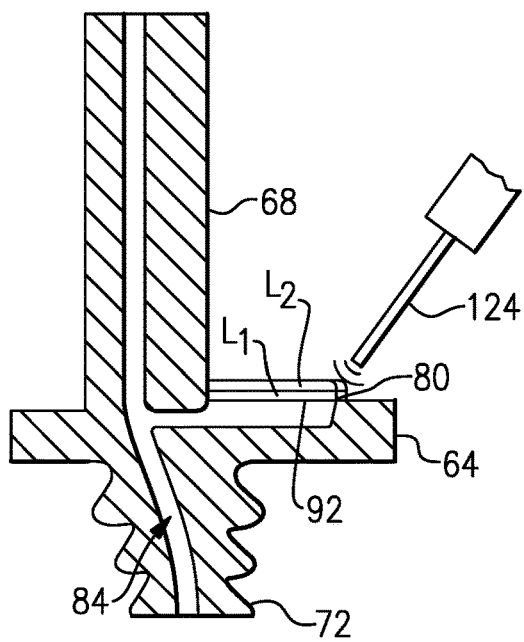
FIG. 8 illustrates the section of the gas turbine engine blade assembly of FIG. 5 at Line 3-3 when forming the cupped contour on the endwall.

Referring now to FIG. 8, an additive manufacturing process is used, in this example, to form the cupped contour 80 on the endwall 64, which will cover the opening 92. Adding the cupped contour 80 after casting, rather than casting the cupped contour 80, can reduce manufacturing complexity associated with casting components of complex geometries.

The cupped contour 80 has a material composition that can be different than a material composition of the remaining portions of the blade assembly 60. Typical materials are classed as superalloys of the nickel or cobalt base element variety with typical materials being PW1484, CMSX-4, Mar-M-247, Mar-M-509, Rene 80, Rene N5, Haynes Alloy X, Inconel 625, Inconel 723, and others whose material properties are suitable to high temperature applications.

Additive manufacturing uses a wand 124 to stack successive layers L1 and L2 of material, and additional layers, until the desired cupped contour 80 is formed and covers the opening 92. The endwall 64 and remaining portions of the blade assembly 60 can be preheated from 500 to 1900 degrees Fahrenheit to facilitate adhesion between the cupped contour 80 and the remaining portion of the blade assembly 60, for example. The preheating temperature is typically 500 degrees Fahrenheit below the sintering temperature of the deposited material. Upon initial deposit, secondary heating operations with the laser can be used to further consolidate the material and provide heat treatment to further solution the alloy.

Air can move from the cooling channel 84 of the endwall 64 through the opening 92 into the cooling chamber 96, and from the cooling chamber 96 through the opening back to the cooling channel 84 of the endwall 64. Thus, air can move to the cooling chamber 96 and from the cooling chamber 96 through the singular opening 92 of the cooling channel 84.

In another example, one or more cooling channels in the endwall 64 open to the cooling chamber 96 to permit air air into the cooling chamber 96, and one or more other cooling channels open to the cooling chamber 96 to permit air to move from the cooling chamber 96 back to the network of cooling channels 84 in the endwall 64.

Air could move from to or from the cooling chamber 96 through an opening in the airfoil 68, or another portion of the blade assembly 60 in other examples.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A gas turbine engine assembly, comprising:
an endwall having a first material composition, wherein an airfoil extends in a radial direction from the endwall;
a cupped contour of a second material composition that is formed on the endwall to define a cooling chamber, the first material composition different than the second material composition, and wherein the cooling chamber is defined between the cupped contour and a radially facing surface of the endwall with respect to the radial direction; and
wherein the endwall includes at least one cooling channel, the at least one cooling channel includes a cooling passage and a groove formed in the radially facing surface of the endwall, the groove interconnects the cooling passage and the cooling chamber, and a length of the groove defines an elongated opening along the radially facing surface that opens to the cooling chamber.

2. The gas turbine engine assembly of claim 1, wherein the airfoil extends in the radial direction from the endwall to a tip.

3. The gas turbine engine assembly of claim 2, wherein the cupped contour slopes from a sidewall of the airfoil towards the radially facing surface of the endwall.

4. The gas turbine engine assembly of claim 3, wherein the endwall is a platform that extends in a thickness direction between a pair of mate faces, the cupped contour is spaced apart from the mate faces of the endwall to establish an exposed portion of the radially facing surface of the endwall, the cupped contour establishes a first region of a gas path surface, the exposed portion of the radially facing surface of the endwall establishes a second region of the gas path surface that extends from the first region, and the wherein the airfoil extends in the radial direction from the first region of the gas path surface to the tip.

5. The gas turbine engine assembly of claim 4, wherein the endwall is entirely radially misaligned from the cooling chamber relative to the radial direction.

6. The gas turbine engine assembly of claim 4, wherein the length of the groove extends in the thickness direction from a sidewall of the airfoil to a terminal end, and the terminal end is covered by the cupped contour.

7. The gas turbine engine assembly of claim 6, wherein the endwall is an endwall of a blade comprising the airfoil.

8. The gas turbine engine assembly of claim 1, wherein the endwall is entirely radially misaligned from the cooling chamber relative to the radial direction.

9. The gas turbine engine assembly of claim 1, wherein the endwall is an endwall of a blade comprising the airfoil.

10. The gas turbine engine assembly of claim 1, wherein the endwall is a cast endwall, and the cupped contour is and additively manufactured cupped contour.

11. A gas turbine engine blade assembly, comprising:
an endwall with a plurality of cooling channels;
an airfoil extending radially from the endwall to a tip;
a cupped contour formed on the endwall to provide a cooling chamber between the cupped contour and a radially facing surface of the endwall; and
wherein the plurality of cooling channels includes a groove formed in the radially facing surface of the endwall such that a length of the groove defines an elongated opening along the radially facing surface that opens to the cooling chamber.

12. The gas turbine engine assembly of claim 11, wherein the cupped contour slopes from a sidewall of the airfoil towards the radially facing surface of the endwall.

13. The gas turbine engine assembly of claim 11, wherein the endwall defines a portion of a gas path surface.

14. The gas turbine engine blade assembly of claim 13, wherein the endwall has a first material composition, and the cupped contour has a second material composition different than the first material composition.

15. The gas turbine engine blade assembly of claim 11, wherein the endwall is a cast endwall, and the cupped contour is and additively manufactured cupped contour.

16. The gas turbine engine blade assembly of claim 11, wherein the endwall has a first material composition, and the cupped contour has a second material composition different than the first material composition.

* * * * *